United States Patent
Kothandam

(10) Patent No.: US 9,611,450 B2
(45) Date of Patent: Apr. 4, 2017

(54) PROCESS FOR THE REMOVAL OF POLYMER THERMOSETS FROM A SUBSTRATE

(75) Inventor: Krishnamoorthy Kothandam, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 908 days.

(21) Appl. No.: 13/814,095

(22) PCT Filed: Aug. 5, 2011

(86) PCT No.: PCT/IB2011/001821
§ 371 (c)(1),
(2), (4) Date: Jun. 27, 2013

(87) PCT Pub. No.: WO2012/017307
PCT Pub. Date: Feb. 9, 2012

(65) Prior Publication Data
US 2013/0263888 A1    Oct. 10, 2013

(30) Foreign Application Priority Data
Aug. 5, 2010  (IN) .......................... 1844/DEL/2010

(51) Int. Cl.
| | | |
|---|---|---|
| B08B 3/08 | (2006.01) | |
| C11D 7/32 | (2006.01) | |
| C11D 3/386 | (2006.01) | |
| C11D 11/00 | (2006.01) | |
| C09D 9/00 | (2006.01) | |
| C11D 3/38 | (2006.01) | |

(52) U.S. Cl.
CPC .............. C11D 7/3263 (2013.01); B08B 3/08 (2013.01); C09D 9/005 (2013.01); C11D 3/38 (2013.01); C11D 3/386 (2013.01); C11D 11/0047 (2013.01); Y02P 20/582 (2015.11)

(58) Field of Classification Search
CPC ......... B08B 3/08; B08B 3/10; B08B 2220/01; B08B 2220/04; H05K 3/284; H05K 3/288; C08G 59/4064
See application file for complete search history.

(56) References Cited

U.S. PATENT DOCUMENTS

| | | | | |
|---|---|---|---|---|
| 4,882,399 A | * | 11/1989 | Tesoro | .................... C08G 59/18 525/523 |
| 5,721,204 A | | 2/1998 | Maxwell et al. | |
| 6,117,829 A | | 9/2000 | Diaz et al. | |
| 6,344,523 B1 | * | 2/2002 | Hawthorne | ............ C08K 5/372 428/297.4 |
| 2002/0156333 A1 | * | 10/2002 | Rosen | ...................... C10G 1/10 585/241 |
| 2005/0066995 A1 | * | 3/2005 | Coico | .................... C09D 9/005 134/2 |
| 2006/0063273 A1 | * | 3/2006 | Asogawa | ............... G01N 30/72 436/180 |
| 2009/0092554 A1 | * | 4/2009 | Skaff | .................... A61K 9/1075 424/9.3 |
| 2009/0137777 A1 | | 5/2009 | Iwashima et al. | |

FOREIGN PATENT DOCUMENTS

WO    WO 2010042823 A1 *    4/2010    ........... A61K 9/1273

OTHER PUBLICATIONS

International Search Report and Written Opinion for PCT Application No. PCT/IB2011/001821, dated Nov. 3, 2011, 8 pages.

* cited by examiner

Primary Examiner — Michael Kornakov
Assistant Examiner — Natasha Campbell
(74) Attorney, Agent, or Firm — Westman, Champlin & Koehler, P.A.

(57) ABSTRACT

The present invention relates to a process for the removal of polymer thermosets from the substrates without damaging the substrates. The present invention relates to a process for the removal of polymer thermoset from the substrate retaining the physical and chemical properties of the substrates. The present invention more particularly relates to the use of bio molecules for cleaving polymer thermosets and the process to perform the cleaving.

7 Claims, 4 Drawing Sheets

PROCESS FOR THE REMOVAL OF POLYMER THERMOSETS FROM A SUBSTRATE

CROSS-REFERENCE TO RELATED APPLICATION

This Application is a Section 371 National Stage Application of International Application No. PCT/IB2011/001821, filed 5 Aug. 2011 and published as WO 2012/017307 A1 on 9 Feb. 2012, in English, the contents of which are hereby incorporated by reference in their entirety.

FIELD OF THE INVENTION

The present invention relates to a process for the removal or cleaving of polymer thermosets from the substrates without damaging the substrates. The present invention particularly relates to a process for the removal or cleaving of polymer thermosets from the substrates that are available for recycle or reuse. The present invention more particularly relates to a process for the removal of polymer thermoset from the substrate retaining the physical and chemical properties of the substrate. The present invention more particularly relates to the use of bio molecules for cleaving polymer thermosets and the process to perform the cleaving.

BACKGROUND OF THE INVENTION

Packaging and sealing are imperative in the efficient functioning of electronic devices, because they provide environmental protection, mechanical stability and thermal insulation to a device. The packaging and sealing material is usually applied on a device while it is a viscous liquid and allowed to cure. The curing process is initiated by simple mixing of polymer resin with a hardener. The resin comprises epoxy moieties and the hardener comprises either amine or acid functionalities. Upon mixing, the facile reaction between the amine functionalities of the hardener and the epoxy functionalities of the resin results in the formation of highly cross-linked polymer network that are known as polymer thermosets (PTs). Such a network is responsible for the desired properties of the PTs, paradoxically they also make the PTs insoluble and infusible. Consequently, thorough removal of PTs without destroying underlying substrate is difficult or impossible, which in turn hinders the reuse of the substrates.

Thus there is a need to remove polymer thermosets completely from substrates without affecting or sacrificing the substrate and its physical and chemical properties. It is also observed that substrates that can be separated from thermosets without damage or loss in properties can result in tremendous economic benefits due to reuse and recycle.

Journal of Applied Polymer Science, Vol. 39, 1425-1437 (1990) and Journal of Applied Polymer Science, Vol. 39, 1439-1457 (1990) describes the reversible cross linking in epoxy resins. They have observed that the S—S bond can be cleaved under harsh conditions.

U.S. Pat. No. 6,841,710, describes a process for degrading polymers of disulphide plastics has been reported, said process comprising adding to the disulphide plastics, an effective amount of a reducing agent having a thiol group and for fracturing the chemical bonds in said plastics and producing a variety of monomers and degradation products wherein said reducing agent is selected from a group of compounds having a thiol group.

US20090137777, discloses a specific poly epoxy compound having at least two olefin oxide groups and at least one tertiary ester group per molecule, a method for producing the compound, a thermosetting resin composition containing the compound, a cured product of the composition, and a method for removing the cured product; wherein said method for removing a cured product, comprises heating the whole or part of the cured product at a temperature higher than the heat-curing temperature to thermally cleave a tertiary ester bond derived from the poly epoxy compound (B), and removing the heated portion of the cured product by using or not using a treatment agent.

Removing polymer thermoset without destroying underlying substrates has not been demonstrated. Also prior art processes execute the process of removal of polymer thermoset at very harsh conditions, which is not very desirable. In fact, the harsh conditions are likely to destroy the substrate, which will eventually make the substrate unavailable for reuse.

Therefore, there is a need to provide agents that will cause cleavage of bonds and thus remove thermosets from substrate without damaging the substrate.

There is also a need to remove polymer thermoset from substrate in such a way that the substrate retains it physical and chemical properties.

Another need is that the agent and the process to remove polymer thermoset from substrate is mild and works in mild process conditions. As mentioned earlier, if the condition is harsh, the substrate is destroyed. Therefore, a mild condition is required for thermoset removal that renders the possibility of substrate reuse.

OBJECTIVE OF THE INVENTION

The primary objective of the present invention is to provide a process for the removal or cleaving of polymer thermosets from the substrate without the damage of the substrates.

Another objective of the present invention is to provide a process for the removal or cleaving of polymer thermosets from the substrates that are available for recycle or reuse.

Yet another objective of the present invention is to provide a process to remove polymer thermoset from substrate such that the substrate retain its inbuilt properties and characteristics.

Yet another objective of the present invention is to provide a process to remove polymer thermoset from substrate in mild conditions.

SUMMARY OF THE INVENTION

Accordingly the present invention relates to a process for the removal of polymer thermoset from a substrate by using cleaving agent without damaging the substrate and the said process comprising the steps of: (i) providing polymer thermoset coated substrate, (ii) preparing 10 to 50% cleaving agent solution in a solvent, (iii) removing the polymer thermoset by dipping the substrate as provided in step (i) in cleaving agent solution as prepared in step (ii) for a period in the range of 2 to 6 h at a temperature in the range of 20° C. to 100° C., more preferably in the range of 22 to 40° C. to obtain the undamaged substrate on the removal of polymer thermoset.

In a preferred aspect polymer thermoset used in step (i) is an epoxy resin containing cross linker having at least one S—S bond.

In another aspect of the present invention the cross linker is cystamine.

Yet in another aspect of the present invention the cleaving agent used in step (ii) comprises oxidizing or reducing molecules particularly bio molecules.

Yet in another aspect of the present invention the bio molecules comprises peptides, proteins or enzymes or combination thereof.

Yet in another aspect of the present invention the biomolecules are selected from the group consisting of glutathione, thioredoxin, peroxiredoxin or dithiothreitol (DTT) or combination thereof.

Yet in another aspect of the present invention the substrate used in step (i) are made of material consisting of glass, silicon, ITO (Indium-doped Tin Oxide) coated glass, metal, metal alloy, semi conductor and polymers.

In another aspect of the present invention the use of biomolecules, comprises of peptides, proteins or enzymes for the removal of polymer thermosets from the substrate, without damaging the substrate.

DETAILED DESCRIPTION OF THE INVENTION

Figure 1:
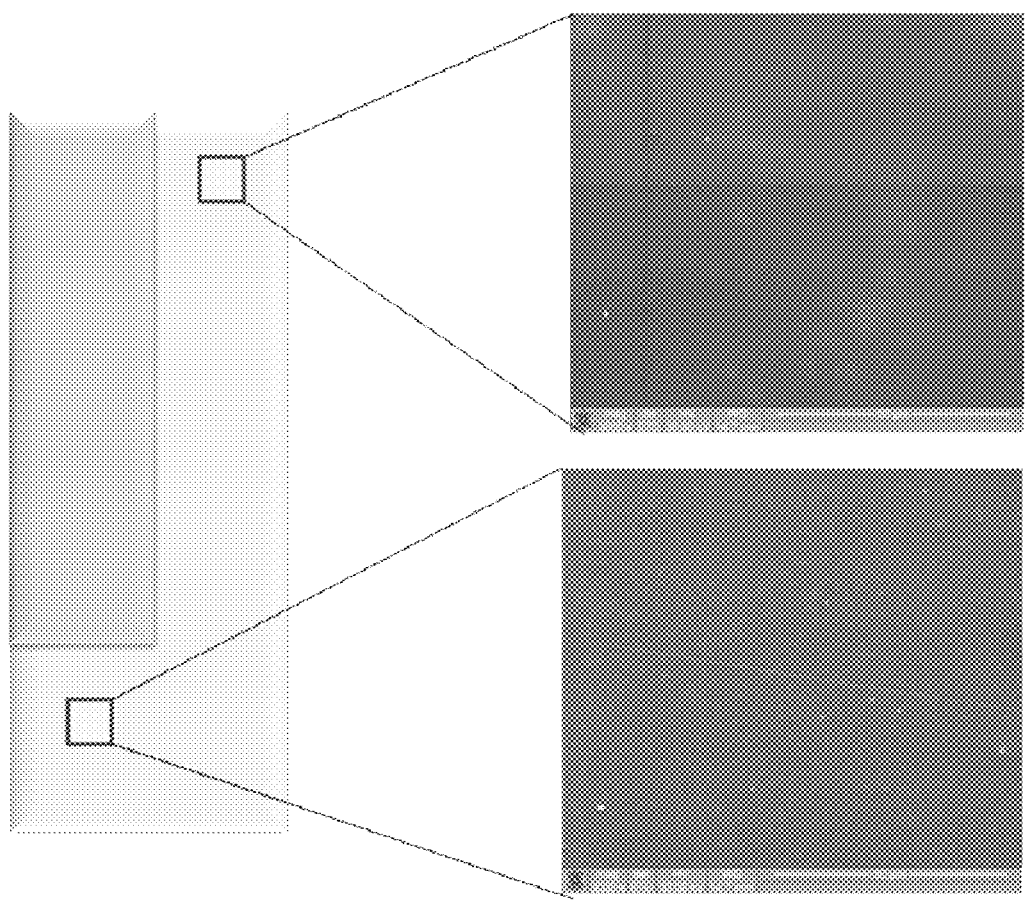
FIG. 1: SEM image of the removal of polymer thermosets from transparency sheet substrate.

While the invention is susceptible to various modifications and alternative forms, specific aspect thereof has been shown by way of example and graphs and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The Applicants would like to mention that the examples are mentioned to show only those specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process, biomolecules, thermosets, cross linkers that comprises a list of components does not include only those components but may include other components not expressly listed or inherent to such process. In other words, one or more elements in a system or process proceeded by "comprises . . . a" does not, without more constraints, preclude the existence of other elements or additional elements in the system or process.

In the following detailed description of the aspects of the invention, reference is made to the accompanying graphs that form part hereof and in which are shown by way of illustration specific aspects in which the invention may be practiced. The aspects are described in sufficient details to enable those skilled in the art to practice the invention, and it is to be understood that other aspects may be utilized and that charges may be made without departing from the scope of the present invention. The following description is, therefore, not to be taken in a limiting sense, and the scope of the present invention is defined only by the appended claims.

Accordingly the present invention relates to a process for the removal or cleaving of polymer thermoset from a substrate by using cleaving agent without damaging the substrate and the said process comprising the steps of: (i) providing polymer thermoset coated substrate, (ii) preparing 10 to 50% cleaving agent solution in a solvent, (iii) removing the polymer thermoset by dipping the substrate as provided in step (i) in cleaving agent solution as prepared in step (ii) for a period in the range of 2 to 6 h at a temperature in the range of 20° C. to 100° C., more preferably in the range of 22 to 40° C. to obtain the undamaged substrate on the removal of polymer thermoset.

In a preferred aspect polymer thermoset used in step (i) is an epoxy resin containing cross linker having at least one S—S bond.

In another aspect of the present invention the cross linker is cystamine.

Yet in another aspect of the present invention the cleaving agent used in step (ii) comprises oxidizing or reducing molecules particularly bio molecules.

Yet in another aspect of the present invention the bio molecules comprises peptides, proteins or enzymes or combination thereof.

Yet in another aspect of the present invention the biomolecules are selected from the group consisting of glutathione, thioredoxin, peroxiredoxin or dithiothreitol (DTT) or combination thereof.

Yet in another aspect of the present invention the substrate used in step (i) are made of material consisting of glass, silicon, ITO (Indium-doped Tin Oxide) coated glass, metal, metal alloy, semi conductor and polymers.

In another aspect of the present invention the solvent used is water, methanol, ethanol, chloroform or acetonitrile or combinations thereof.

In another aspect of the present invention the use of biomolecules, comprises of peptides, proteins or enzymes for the removal of polymer thermosets from a substrate, without damaging the substrate.

Present invention provides a process for the removal or cleaving of polymer thermosets from the specific substrate leaving behind substrates that are undamaged and available for recycle or reuse wherein the cleaving agent selected from oxidizing and reducing molecules and biomolecules that can separate polymer thermosets from substrates without making any damage to substrate and loss in the substrate's physical and chemical properties in mild conditions. Glutathione is exemplified as the cleaving agent.

To achieve the present objective of providing a solution for removing polymer thermoset completely without affecting the substrate and its physical and chemical properties, the present invention propose the use of agents comprising oxidizing or reducing molecules or biomolecules. The biomolecules of the present invention are selected from, but not limited to peptides, proteins or enzymes. For the purpose of ease in the description, these agents will be referred to as "Cleaving agents".

More particularly the present invention is a one step process of contacting the polymer thermoset with the solution of the cleaving agent resulting in the removal of the thermoset leaving behind the intact substrate, wherein the substrate is coated with a cleavable cross linker.

The process conditions are:

Temperature: ambient (20° C. to 40° C.)
Pressure: ambient (760 mmHg)

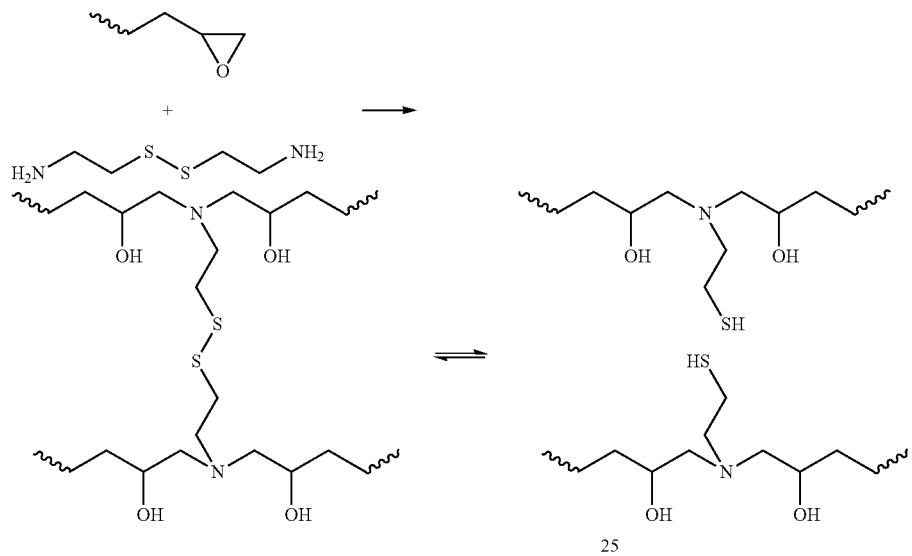

The cleaving agent of the invention comprises oxidizing and reducing molecules, particularly biomolecules. The biomolecules of the invention comprises peptides, proteins and enzymes. The biomolecules of the invention are more particularly glutathione, thioredoxin, peroxiredoxin and Dithiothreitol (DTT).

The cleavable cross linker should have at least one S—S bond, preferably cystamine.

The solution of the cleaving agent is prepared in solvents that can be aqueous or nonaqueous or combinations thereof. The cleaving agents are dissolved in water, methanol, ethanol, chloroform, acetonitrile or in combinations thereof. They are used to cleave at room temperature (20° C.-40° C.).

Process is carried out at a temperature in the range of 20° C.-100° C. Substrates are made of material of construction selected from glass, silicon, Indium-doped Tin Oxide (ITO) coated glass, metal, metal alloy, semi conductor and polymers. In case of ITO coated glass, the thickness of ITO varies depending on the manufacturer.

The room temperature (20° C.-40° C.) process of removing the polymer thermoset from a substrate without damaging the substrate at mild conditions comprises:
  i. providing polymer thermoset coated substrate, particularly epoxy type polymer thermoset mixed with cross linker having S—S bond;
  ii. dipping the polymer thermoset coated substrate as provided in step (i) with cleaving agent for period in the range of 2 h to 6 h, at atmospheric pressure (760 mmHg) and ambient temperature (20° C.-40° C.).

EXAMPLES

The following examples are given by way of illustration therefore should not be construed to limit the scope of the present invention.

Example 1

Epoxy resin (0.58 g) was mixed with cystamine (0.12 g) to form a viscous mass. One half of the transparency sheet was coated with the cleavable epoxy thermoset (viscous mass) as shown in FIG. 1. The coating was allowed to dry for 6 h at 30° C. temperature. (A temperature outside the range 20 to 40° C. doesn't have an adverse effect.) After curing the ¼$^{th}$ of the sheet was immersed in cleaving agent. i.e glutathione (10% solution in water) for 2 h. This step removed epoxy thermoset from the substrate, wherever it was in contact with cleaving agent The thermoset in the dipped portion degraded and came off from the surface during the glutathione exposure. The disulfide functionality that is an integral part of the crosslinker is converted to thiol, leading to breakage in cross linking.

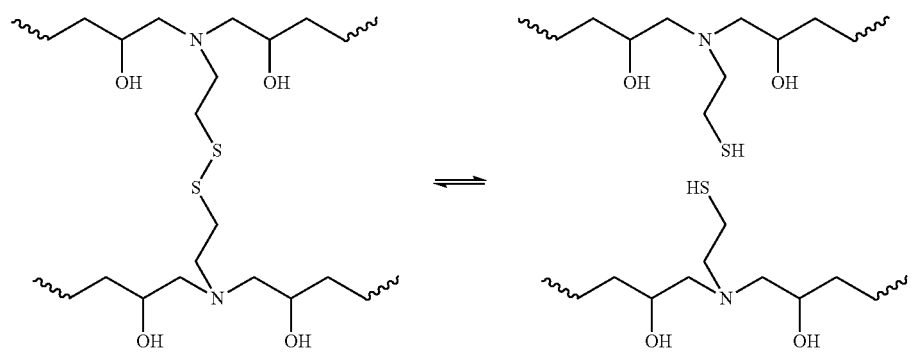

The substrate was dried and characterized by SEM (Scanning Electrom Microscopy) to study the effect of coating and removal of epoxy thermoset. It was observed that there were no discernible changes on the surface due to the coating and removal of thermosets. FIG. 1 represents the removal of polymer thermosets from transparency sheet substrate.

Example 2

Figure 2:
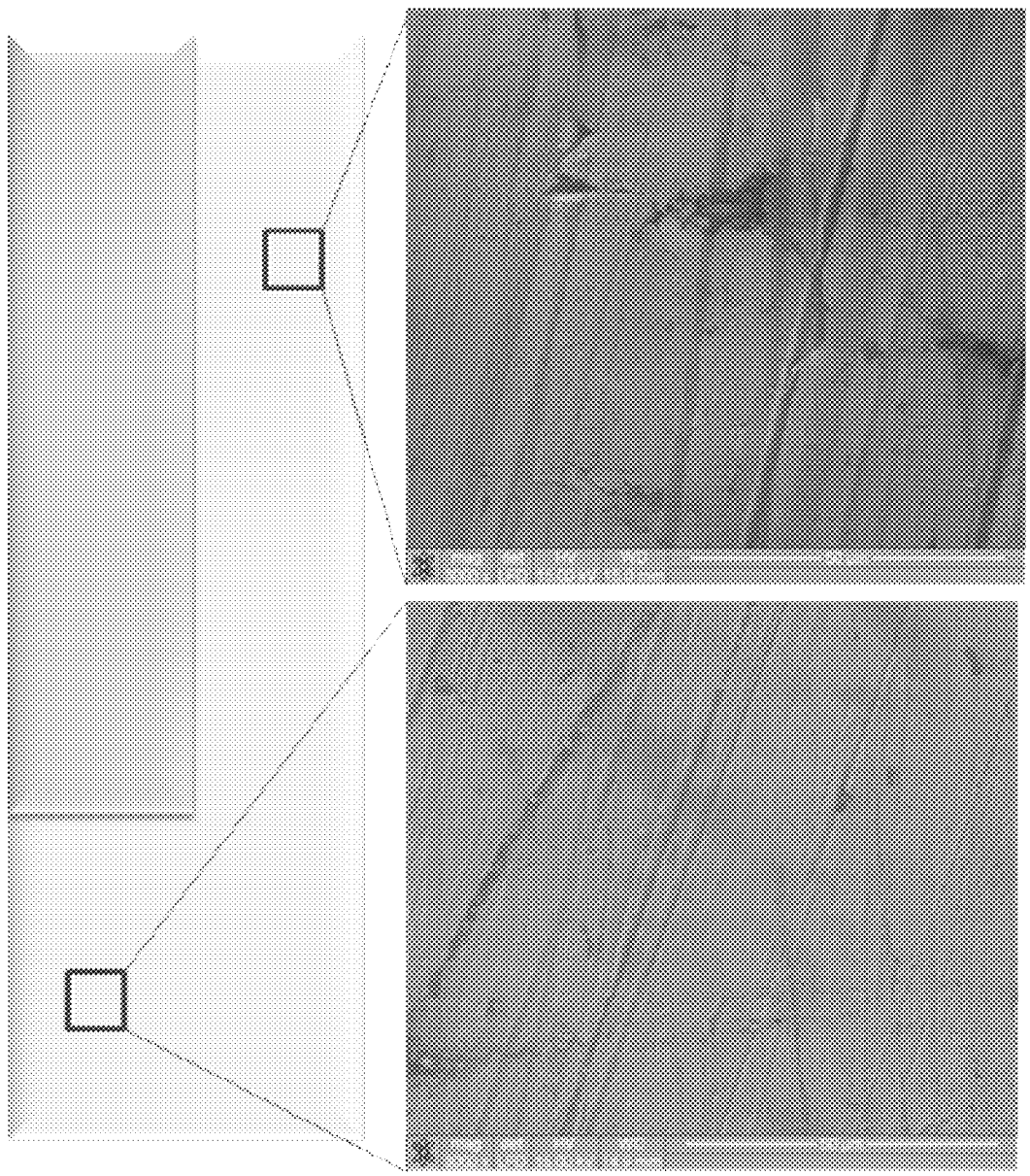
FIG. 2: SEM image of the removal of polymer thermosets from copper sheet substrate.

One half of the copper sheet was coated with the cleavable epoxy thermoset. After curing as discussed in Example 1 the $\frac{1}{4}^{th}$ of the sheet was immersed in cleaving agent. This step removed epoxy thermoset from the substrate, which was exposed to cleaving agent (glutathione). Polymer thermosets was removed from copper sheet substrate. This is necessary because many of the transistors used in electronic circuit board are coated with thermoset. Thus, removal of thermoset from copper would enable the reuse of electronic circuit board. The substrate was characterized by SEM to study the effect of coating and removal of epoxy thermoset. FIG. 2 represents removal of polymer thermosets from copper sheet substrate.

Example 3

Figure 3:
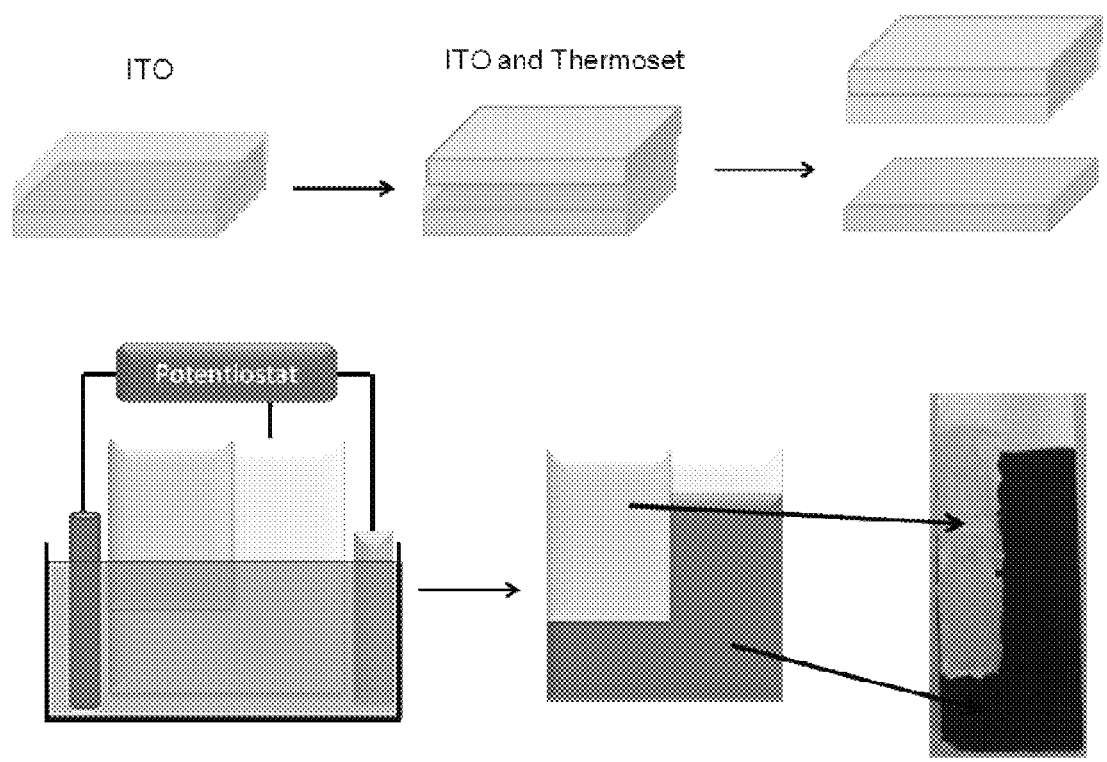
FIG. 3: SEM image of the removal of polymer thermosets from ITO coated glass substrate.

ITO (indium doped tin oxide) was coated with thermoset and removed as exemplified in example 1. The thickness of ITO on glass is 30 nm. While a thermoset is removed from such surface, there are two possibilities (i) thin ITO layer may come off with the thermoset or (ii) small amount of thermoset is left on the surface. In both the scenarios, the conducting ITO becomes an insulator that would make the ITO unusable. To test this, poly(3,4-ethylenedioxythiophene) (PEDOT) was electro synthesized on a ITO coated glass (ITO is a conductor) and on the thermoset coating removed from the ITO coated glass. In both the said cases (PEDOT) was electro synthesized on the ITO. Hence, ITO was conductor before and after the removal of thermoset coating and maintaining its physical and chemical properties. There are no discernible changes between the coated-removed surface and uncoated surface as shown in FIG. 3. The pH of the solution was 7 and the experiment was carried out at atmospheric pressure (760 mmHg).

FIG. 3 represents removal of polymer thermosets from ITO coated glass substrates followed by electrochemical deposition of poly (3, 4-ethylenedioxythiophene). Optoelectronic devices are encapsulated with thermoset to protect from atmospheric degradation. These devices comprise indium doped tinoxide (ITO). Indium is not abundantly available and is very expensive. Thus, reuse of ITO has economic benefits. Usually, a thin layer (~30 nm) is coated on top of glass substrate to render conductivity to an insulating substrate. The ITO coating thickness varies depending on the manufacturer. While removing thermoset from a ITO coated glass, two possibilities exist (i) ITO is damaged and removed from the substrate and (ii) thermoset is not completely removed. Both will lead to insulating domains, which will make the substrate unavailable for reuse. Herein, we demonstrate that the thermoset can be completely removed from ITO coated glass slide. We also show that the conductivity of the ITO is unaffected by electrodepositing poly (3,4-ethylenedioxythiophene).

Example 4

Figure 4:
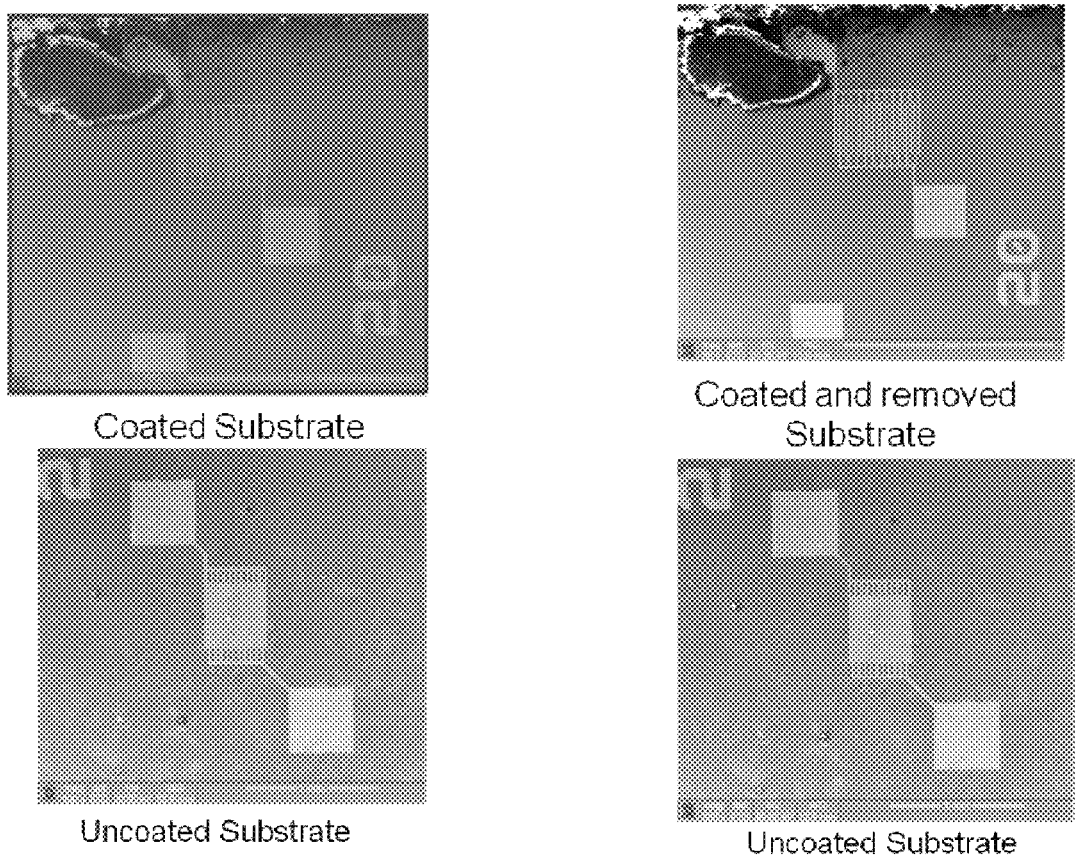
FIG. 4: SEM image of the removal of epoxy thermoset from transistor substrates.

Transistor substrates were coated with thermoset and removed. FIG. 4 represents removal of epoxy thermoset from Transistor substrates. It was observed that the ~10 nm thick gold film is unaffected during the thermoset removal as characterized by SEM.

The advantages of the disclosed invention are thus attained in an economical, practical, and facile manner. While preferred aspects and example configurations have been shown and described, it is to be understood that various further modifications and additional configurations will be apparent to those skilled in the art. It is intended that the specific embodiments and configurations herein disclosed are illustrative of the preferred nature and best mode of practicing the invention, and should not be interpreted as limitations on the scope of the invention.

ADVANTAGES OF THE INVENTION

The main advantages of the present invention are
1. Removal of thermoset from substrate without affecting the substrate's physical and chemical properties.
2. The process is conducted under mild conditions such as neutral pH, room temperature and atmospheric pressure, making it an environmentally benign process.

The invention claimed is:
1. A process for the removal of polymer thermoset from a substrate by using cleaving agent without damaging the substrate and the said process comprising the steps of:
   i. providing a polymer thermoset coated substrate, wherein polymer thermoset is an epoxy resin containing cross linker having at least one S—S bond,
   ii. preparing 10 to 50% cleaving agent solution in a solvent, wherein the cleaving agent comprises biomolecules,
   iii. removing the polymer thermoset by dipping the substrate as provided in step (i) in cleaving agent solution as prepared in step (ii) for a period in the range of 2 to 6 h at a temperature in the range of 20° C. to 100° C. to obtain the substrate on the removal of polymer thermoset.
2. The process as claimed in claim 1, wherein the cross linker is cystamine.
3. The process as claimed in claim 1, wherein bio molecules comprises peptides, proteins or enzymes or combinations thereof.
4. The process as claimed in claim 1, wherein biomolecules are selected from the group consisting of glutathione, thioredoxin, peroxiredoxin or dithiothreitol (DTT) or combination thereof.
5. The process as claimed in claim 1, wherein substrate used in step (i) are made of material selected from the group of materials consisting of glass, silicon, ITO (Indium-doped Tin Oxide) coated glass, metal, metal alloy, semi conductor and polymers.
6. The process as claimed in claim 1, wherein solvent is water, methanol, ethanol, chloroform or acetonitrile or combinations thereof.
7. A method of removing polymer thermosets from a substrate, comprising:
   applying biomolecules to the substrate which comprises peptides, proteins, enzymes glutathione, thioredoxin, peroxiredoxin or dithiothreitol (DTT) or combination thereof thereby removing polymer thermosets from the substrate, without damaging the substrate, wherein polymer thermoset is an epoxy resin containing cross linker having at least one S—S bond.

* * * * *